UNITED STATES PATENT OFFICE.

WILHELM PAU AND PAUL EBERHARDT, OF GRABOW, GERMANY, ASSIGNORS TO THE FIRM OF RÜTGERSWERKE-AKTIENGESELLSCHAFT, OF BERLIN, GERMANY.

PROCESS FOR WORKING UP THE ACID SLUDGE AND LIQUORS PRODUCED AS BY-PRODUCTS DURING THE WASHING OF MINERAL OILS.

1,092,386.     Specification of Letters Patent.     Patented Apr. 7, 1914.

No Drawing.     Application filed October 25, 1911. Serial No. 656,674.

*To all whom it may concern:*

Be it known that we, WILHELM PAU, chemist, a subject of the King of Prussia and the German Emperor, and PAUL EBERHARDT, chemist, a subject of the Prince of Lippe and the German Emperor, residing at Grabow, Grand Duchy of Mecklenburg, German Empire, have invented a new and useful Improvement in Processes for Working Up the Acid Sludge and Liquors Produced as By-Products During the Washing of Mineral Oils; and we do hereby declare the following to be a full, clear, and exact description of the same.

A primary object of this invention is to provide a process for working up the acid sludge and liquors, produced as by-products during the washing of mineral oils, commercially valuable products being simultaneously obtained.

The process according to the invention consists in firstly extracting the resinous constituents from the waste acids. This step is based on the observation that coal-tar oils having a high boiling point dissolve the resinous constituents from waste acids which have been previously diluted. The waste acids are preferably heated during this operation. The waste acids which are obtained as viscous waste by washing the various petroleum fractions, (such as *e. g.* crude benzin, crude petroleum, crude solar oil, crude paraffin, lubricating oils, etc.), by means of sulfuric acid of 66° B. are mixed conveniently with each other. This is conveniently done by causing the waste acids from washing the various petroleum fractions to flow into vessels lined with lead, conveniently having a funnel-shaped bottom. In order to facilitate a thorough mixing one may agitate the waste acids. The mixture of waste acids is diluted with water and mixed with coal-tar oils. The degree of the dilution with water is dependent on the viscosity of the acid. It should be such that the layer of coal-tar oil separates well from the acid solution. Too great dilution of the acid is to be avoided in order to enable the same to be worked up. In general, an amount of water equal to one-third of the weight of sulfuric acid, $H_2SO_4$ of the specific gravity 1.8385, which is used will be employed. The coal-tar oils which are used may advantageously be preliminarily purified, but this is not necessary. One may use in the said treatment the coal-tar oils having a boiling point between 200° C. and 300° C., called commercially "medium tar oils" or "heavy tar oils". The dilution of the acid is such that there is no fear of resinous substances being precipitated or separated from the coal-tar oil. The mixture is well agitated, preferably while heated *e. g.* to about 70° C., and left to stand. After having stood for a sufficient time, twelve hours being in general requisite, the waste sulfuric acid is drawn off as the bottom layer. The solution of the acid resins in coal-tar oils may be used for coating or impregnating porous substances as pasteboard wood, stones. The next step relates to the treatment of the solution of the acid resins in the coal-tar oil. The solution is mixed with the requisite quantity of caustic soda lye until a distinctly alkaline reaction is obtained and then left to stand. An excess of soda lye is preferably avoided in order to save reagents as much as possible, and because an excess would render the lye less available for preparing emulsions by mixing the lye with coal-tar oils and water. The waste lye settles at the bottom and is drawn off. It is clear, dark brown in color, has a peculiar leek-like odor and an alkaline reaction. The same is an aqueous solution of organic soda compounds; *e. g.* salts of sulfo acids of high molecular organic acids or of phenols. A mixture of a definite volume of this waste lye with one of coal-tar oil having a high boiling point is a homogenous solution which when diluted with water yields stable light-colored emulsions. The said alkaline liquid can be employed by itself or, after mixing it with coal-tar, coal-tar oil or both, with mineral oils or with mixtures of mineral oils and coal-tar oils, for sprinkling roads. The coal-tar oil is removed by distillation from the tar oil solution of the neutralized acid-resins. The distillate can be employed again for dissolving acid resins. The residue liberated from coal-tar oil is treated with steam in order to expel the last traces of hydrocarbons adhering to the acid resin. It is an asphalt-like mass which is sold as such on the market. The asphalt which is obtained has a neutral reaction, a specific gravity of 1.050.

*Examples.*

1. The crude waste acid obtained while refining petroleum is mixed with water and coal-tar oil having a boiling point of about 200 to 300° C., the quantity of water being one-third of the weight of monohydrate which is employed. Preferably, for 1 part of waste acid, 0.8 parts of coal-tar oil are employed. The mixture is left to cool and settle. After about twelve hours the acid is run off. The coal-tar oil solution is mixed with soda lye of specific gravity 1.30 until a distinctly alkaline reaction is obtained. The said mixture is then left to settle and the coal-tar oil solution forming the top layer is separated from the lower layer for instance by decantation. The separated coal-tar oil solution may be directly submitted to distillation, in order to recover the coal-tar oil as completely as possible. The remaining residue of the distillation is similar to asphalt. It may be deprived of adhering coal-tar oil by being treated with steam.

2. 1 liter of the alkaline solution obtained according to Example 1 is mixed with 0.5 liters coal-tar oil containing at least 33% acids derived from the tar. The mixture is used for sprinkling trees, shrubs and the like.

3. 1 liter of the alkaline solution obtained according to Example 1 is mixed with 0.5 liters coal-tar oil having a boiling point of about 200° to 300° C. Up to 0.2 liters of tar may be added. The mixture is suitable for sprinkling roads.

We claim:

1. The herein described process of working up the acid sludge produced when washing petroleum with sulfuric acid, which consists in dissolving the acid sludge in the presence of water in a coal-tar oil having a high boiling point, allowing to settle and separating the upper layer of tar-oil from the aqueous acid liquid.

2. The herein described process of working up the acid sludge produced when washing petroleum with sulfuric acid which consists in dissolving the acid sludge in the presence of water in a coal-tar oil having a high boiling point, allowing to settle, separating the upper layer of tar-oil from the aqueous acid liquid and, neutralizing the separated tar-oil solution.

3. The herein described process of working up the acid sludge produced when washing petroleum with sulfuric acid which consists in dissolving the acid sludge in the presence of water in a coal-tar oil having a high boiling point, allowing to settle, separating the upper layer of tar-oil from the aqueous acid liquid, neutralizing the separated tar-oil solution with alkaline solutions separating the upper layer, and distilling off the coal-tar oil therefrom and thereby recovering the tar-oil and obtaining an asphalt-like residue.

4. The herein described process of working up the acid sludge produced when washing mineral oils with sulfuric acid, which consists in diluting the acid sludge with water, in dissolving the same in a heated coal-tar oil having a high boiling point, in neutralizing the solution thereby obtained with soda lye, in distilling off the coal-tar oil therefrom and thereby recovering the coal-tar oil and obtaining an asphalt-like residue.

5. As a new composition of matter, a solution in tar-oil of resinous bodies derived from petroleum.

6. As a new composition of matter, a solution in tar-oil of acid-resins derived from petroleum.

In testimony whereof, we have signed our names to this specification in the presence of two subscribing witnesses.

WILHELM PAU.
PAUL EBERHARDT.

Witnesses:
ERNEST H. L. MUMMENHOFF,
IDA CHRIST. HAFERMANN.